United States Patent [19]

Abaunza et al.

[11] Patent Number: 5,089,822

[45] Date of Patent: Feb. 18, 1992

[54] INTERROGATION SIGNAL PROCESSOR FOR AIR TRAFFIC CONTROL COMMUNICATIONS

[75] Inventors: John T. Abaunza, Goldvein; Scott A. Merritt, Vienna, both of Va.

[73] Assignee: Avion Systems, Inc., Leesburg, Va.

[21] Appl. No.: 479,265

[22] Filed: Feb. 13, 1990

[51] Int. Cl.⁵ .................. G01S 13/76; H04L 5/12
[52] U.S. Cl. .................. 342/30; 342/46; 342/38; 342/40; 342/32; 329/304; 340/825.58; 375/84
[58] Field of Search .............. 342/30, 31, 32, 36, 342/37, 38, 40, 35, 42; 329/304, 345; 340/825.58; 375/84

[56] References Cited

U.S. PATENT DOCUMENTS

| | | | |
|---|---|---|---|
| 4,010,465 | 3/1977 | Dodington et al. | 342/35 |
| 4,568,942 | 2/1986 | Letocquart | 342/408 |
| 4,648,101 | 3/1987 | Hamzaoni et al. | 375/99 |
| 4,677,442 | 6/1987 | Enein | 342/410 |
| 4,757,316 | 7/1988 | Brault et al. | 342/173 |
| 4,757,320 | 7/1988 | Letocquart et al. | 342/410 |
| 4,856,100 | 8/1989 | Lehman | 342/51 |
| 4,890,110 | 12/1989 | Kuwahara | 342/35 |
| 4,899,157 | 2/1990 | Sanford et al. | 342/40 |
| 4,945,550 | 7/1990 | Krause et al. | 375/94 |

Primary Examiner—John B. Sotomayor

[57] ABSTRACT

The present invention is directed to a Mode S uplink or interrogation signal demodulation system which can quickly recognize the Mode S signal and also filter out of noise present in the Mode S uplink or interrogation signal, thereby reducing the bit error rate. To realize this goal the present invention includes a digital differential phase-shift keyed demodulator to demodulate the differential phase-shift keyed data, thereby reducing the time needed to acquire the Mode S uplink or interrogation signal. This digital demodulator also reduces the noise present in the Mode S uplink or interrogation signal and provides an integrated system which is small in structure that can be easily implemented in an aircraft. This Mode S system also includes a preamble and sync phase reversal detection circuit to recognize if the transmitted signal is a Mode S signal. This signal also utilizes Mode A and Mode C detection devices to make the system compatible with present communication systems.

66 Claims, 5 Drawing Sheets

INTERROGATION SIGNAL PROCESSOR FOR AIR TRAFFIC CONTROL COMMUNICATIONS

FIELD OF THE INVENTION

The present invention relates to air traffic control systems in general, and more particularly, relates to the transmission of information between an aircraft and air traffic surveillance sensor (ATSS) or another aircraft by utilizing a novel ATSS interrogation demodulation technique, thereby extending the detection range and sensitivity of the ATSS systems and ATSS transponders.

BACKGROUND OF THE PRESENT INVENTION

In the past, air traffic control radar beacon system ("ATCRBS"), transponder communication systems, utilized Mode C or Mode A protocols in the communication/transmission of altitude and identify or only identity information, respectively, between aircraft and a beacon interrogator secondary surveillance radar (SSR) system. In both the Mode A and Mode C systems, when transmitting information, a secondary surveillance radar would sequentially transmit interrogation signals to aircraft in the area to request information from the aircraft. This signal transmitted by the SSR would contain three (3) pulses with the first pulse and third pulse being separated by a predetermined width wherein these pulses are transmitted at a specific frequency or control tone. The first and third pulses are transmitted from a radar dish having directional characteristics, i.e., 3° beam width. The second pulse is a side lobe suppression signal transmitted from an omni directional antenna co-located at the directional dish. The interrogated object will only recognize this signal if the amplitude of the second pulse is less than the first or third pulse. The time interval between the first and third pulses defines what information the interrogator is requesting, i.e., eight (8) microseconds for identification and twenty-one (21) microseconds for altitude. Upon receipt of this signal, the aircraft would develop a reply signal to supply the requested information consisting of identification and/or altitude location. The SSR will process this information, together with time of arrival range information, to develop a measurement of position for each responding aircraft. The Mode C and Mode A systems are unable to relay information or messages from the SSR to the interrogated aircraft or allow the aircraft to transmit any message other than identification and altitude. The Mode C and Mode A systems also encounter a large amount of interference and garble because Mode C or Mode A interrogation from an ATCRBS beacon interrogation is special, i.e., all aircraft transponds within the main beam of the interrogating SSR reply. This means that 25-45 interrogation and replies are transmitted into the radio frequency environment. This results in proliferation of radio frequency transmissions which can result in a significant amount of interference or garble and a corresponding loss of integrity in the developed track data.

More specifically, an average Air Traffic Control Radar Beacon System (ATCRBS) interrogator sends out 250 to 450 interrogations per second per radio frequency. In a ten second period, an ATCRBS radar will dwell on a specific aircraft for about 100 milliseconds which implies 25 to 45 replies being received by the ATCRBS when only one or two replies are really needed. The result is a multitude of overcapped signals, distortion, and degradation to the ability of the ground controller to carry out surveillance on the local air traffic.

In recognizing these and other deficiencies in the ATCRBS, the Mode Select (Mode S or Discrete Beacon Address System, DBAS) was developed to allow the active transmission of information by a SSR or an aircraft which substantially reduced transmission interference or garble. To realize this purpose, the Mode S sensors were developed to interrogate the targets discretely, not spacially like the ATCRBS. The Mode S sensor transmits a specific I.D. code, i.e., a code specific to the aircraft from which the sensor wants a reply; again, only once or twice. The transmission from the sensor occurs only once or twice, and the aircraft's Mode S transponder will reply. However, Mode S was also developed to function within a Mode A or Mode C environment, i.e., the Mode S preamble can function in the Mode A or Mode C environment. Thus, the Mode S detection circuits will allow full surveillance in an integrated ATCRBS/Mode S environment.

The Mode S sensor produces a tag if aircraft are in the surveillance area by using two techniques, thereby enabling the discrete addressing of these aircraft. One technique is a Mode S SQUITTER performed by the Mode S transponder and the other technique is a Mode S ALL CALL performed by the sensor. In the Mode S ALL CALL, the Mode S emits an ATCRBS like spacial identify interrogation signal which elicits a transponder reply transmission of discrete identification. In the Mode S SQUITTER, the Mode S transponder pseudo-randomly transmits a specific address code, unique to the aircraft to be interrogated, once per second within a range of 200 milliseconds.

To achieve discrete interrogation and elicit or a transponder reply transmission, the Mode S system relies on a preamble having two (2) pulses separated using a predetermined width and are similar in format and modulation to ATCRBS interrogation pulses described above. These pulses are also transmitted by a specific frequency or control tone. Following the Mode S interrogation precycle, the sensor will transmit a differentiated phase shift keyed message of 56 or 112 bit length. To distinguish the preamble of the Mode S transmission from the pulse signals of the Mode C and Mode A transmissions, the Mode S system also transmits a sync phase reversal signal just prior to the transmission of the differential phase-shift keyed data. This transmitted sync phase reversal signal must be transponder by the Mode S transponder within a certain period or time window immediately following the detection of the preamble. If this sync phase reversal signal is received within this time window, the receiver will start processing the subsequent differential phase-shift data being transmitted by the SSR. If the sync phase reversal signal is not received, the transponder may generate a Mode A or Mode C reply.

To implement the receipt of a Mode S signal, analog systems including well known Costa's phase lock loop demodulators, have been developed which are capable of detecting the preamble and sync phase reversal signal while also being capable of demodulating the differential phase-shift keyed data. However, these analog systems require a relatively significant amount of time to acquire Mode S uplink or interrogation signal. Also, the state of the art Mode S data demodulators are not capable of efficiently filtering out the noise associated with the Mode S uplink or interrogation signal in an integrated Mode S/ATCRBS RF environment. Lastly, the analog Mode S demodulator would require a relatively large amount of space in the aircraft, necessitating considerable weight, volume, power comsumption and cost.

SUMMARY OF THE PRESENT INVENTION

The above-mentioned problems and limitations with the currently available Mode S demodulator are overcome by the concepts of the present invention whereby a Mode S uplink or interrogation signal can be quickly recognized and processed while filtering out noise, thereby reducing the bit error rate. According to the teachings of the present invention, a digital differential phase-shift keyed demodulator is utilized to acquire the Mode S preamble and demodulate the differential phase-shift keyed data, thereby reducing the time needed to acquire the Mode S uplink or interrogation signal while reducing or filtering the environment noise present in the received Mode S interrogation signal. The properties of the digital Mode S demodulator allow it to be constructed as an integrated Mode S demodulator system which is small and light in weight, with significant savings in power consumption and cost.

According to the teachings of one embodiment of the present invention, the preamble of the transmitted Mode S signal is received and detected by a preamble detector. Upon detecting the preamble, this preamble detector generates a preamble detecting signal which activates a sync phase reversal detector. Upon activation, the sync phase reversal detector determines whether a sync phase reversal signal has been transmitted by the interrogating ground station or another interrogation source such as active traffic alert and collision avoidance system ("TCAS") which may be installed in nearby aircraft. If the sync phase reversal detector determines that the transmitted signal is a Mode S signal by detecting the sync phase reversal signal, the sync phase reversal detector generates a Mode S verification signal. This Mode S verification signal activates a digital differential phase-shift keyed demodulator which digitally demodulates the Mode S signal to obtain useful information including, but not limited to, identification of the interrogating service, specific reply requested, and other information contained in the 56 or 112 microseconds Mode S uplink-data link.

This digital differential phase-shift keyed demodulator utilizes a finite impulse response filter in combination with a product phase detector. The output from the product phase detector is summed by an accumulator wherein the sum is introduced into a threshold detector to determine the polarity of the summation. If the summation has a positive polarity, the threshold detector generates logic "1" data while if the summation has a negative polarity, the threshold detector generates logic "0" data. Alternatively, the output from the product phase detector is first weighted by a weighting circuit prior to being summed by an accumulator. This weighting of the output of the product phase detector causes the demodulator to rely more heavily on the middle samples. Depending upon the two methods utilized above in the demodulation process, certain types of noise can be effectively cancelled by the digital differential phase-shift keyed demodulator and processing gain realized, thus adding to the overall sensitivity (and hence, the range of usefulness) of the resulting Mode S transponder.

OBJECT OF THE PRESENT INVENTION

It is therefore an object of the present invention to implement a digital differential phase-shift keyed demodulator to be used in the reception and processing Mode S signals in an air traffic control system.

It is another object of the present invention to utilize a digital differential phase-shift keyed demodulator in an air traffic control system to reduce the time needed to acquire the properties of a Mode S uplink or interrogation signal.

It is a further object of the present invention to utilize a digital differential phase-shift keyed demodulator in an air traffic control system to improve the filtering of noise present in the received Mode S uplink or interrogation signal.

It is still a further object of the present invention to utilize a digital differential phase-shift keyed demodulator in an air traffic control system to reduce the bit error rate in the demodulation of a Mode S uplink or interrogation signal.

It is still a further object of the present invention to utilize a digital differential phase-shift keyed demodulator in an air traffic control system to produce a physically small implementation of a Mode S receiver/transponder system to facilitate the installation and operation of the equipment on light aircraft.

It is still another object of the present invention to utilize a digital Mode S demodulator which counters degradation of the Mode S signal by broadband additive noise.

It is still a further another object of the present invention to utilize a digital Mode S demodulator to avoid the degradation of the Mode S signal cause by interference in either edge of the pass-band of the Mode S signal.

It is still a further another object of the present invention to produce a Mode S uplink detection circuit which, by noise and bit error reduction means effectively increases the detection range of a Mode S receiver/transponder system.

These and further objects of the present invention will become more readily apparent from a better understanding of the preferred embodiments described below with reference to the following drawings and figures.

BRIEF DESCRIPTION OF THE DRAWINGS

The present invention will become more fully understood from the detailed descriptions given below and the accompanying drawings which are given by way of illustration only and are not intended to limit the scope of the present invention, and wherein.

The above drawings will be described in detail in the following detailed description wherein like reference numerals correspond to like reference items.

DETAILED DESCRIPTION OF THE PREFERRED EMBODIMENTS OF THE PRESENT INVENTION

The present invention will be described with reference to the general system utilized to transmit Mode S signals in an air traffic communication and control system. However, the preferred embodiments of the present invention may also contemplate the use of the digital Mode S signal demodulator in any environment which may utilize a Mode S or any DPSK modulated signal signal for communication purposes including, for example, an air traffic collision avoidance system and/or satellite system such as that disclosed in allowed U.S. patent application, Ser. No. 07/050,716, filed on May 18, 1987 to Donnangelo et al. and assigned to the assignee of the present application.

Figure 1:
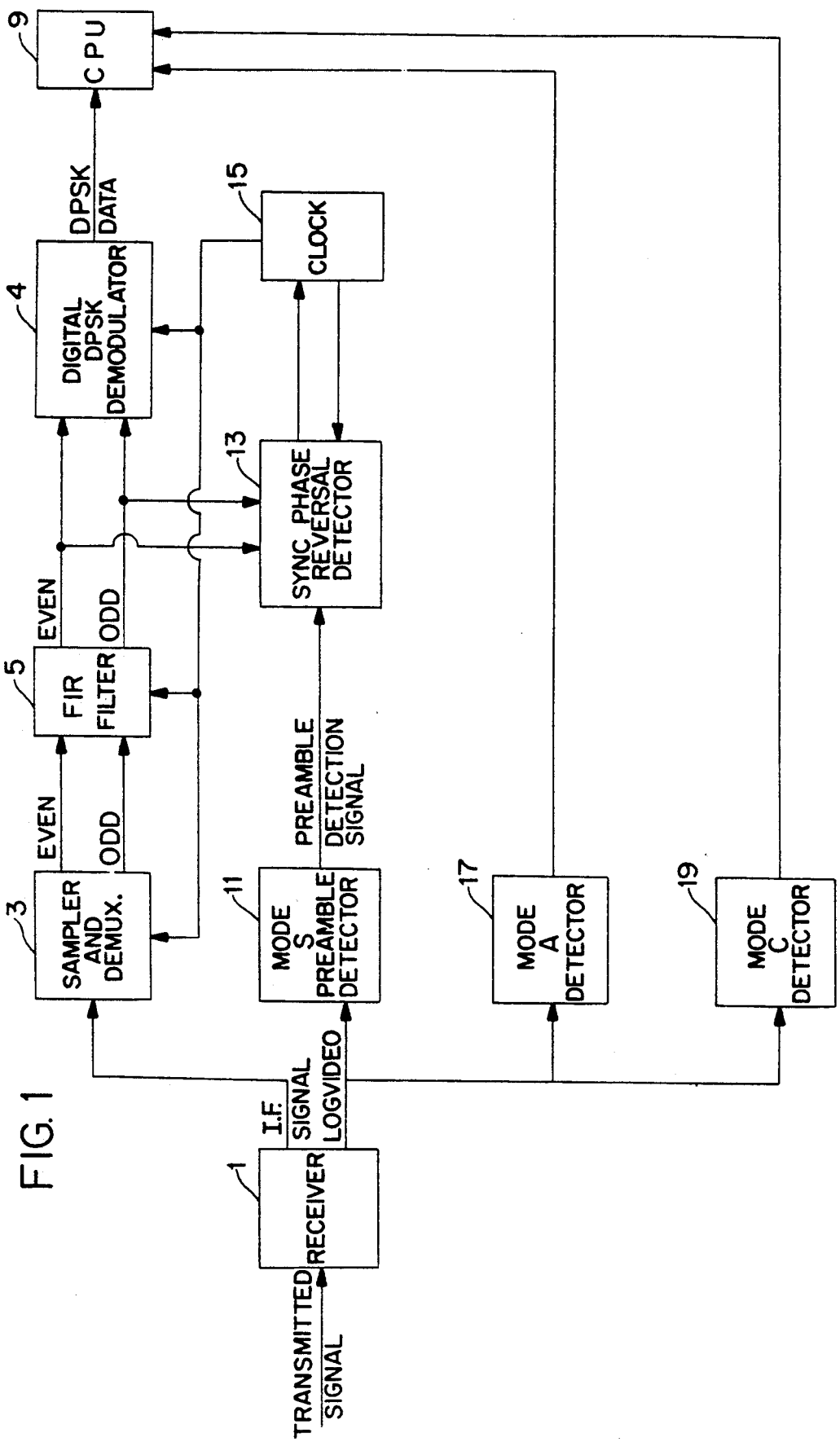
FIG. 1 illustrates a digital Mode S uplink processing system of the present invention.

FIG. 1 illustrates the general digital Mode S uplink processing system to be utilized in an air traffic communication system. In this general digital Mode S uplink processing system, a transmitted Mode S uplink or Discrete Roll Call interrogation signal transmitted by a Mode S sensor is first received by a Mode S transponder or, alternatively, Mode S capable TCAS. This received signal is then converted by a conventional I.F. amplifier into an intermediate frequency (I.F.) signal and a signal related to the logarithm power received.

The I.F. signal produced by the receiver 1, is inputted to a digital sampler and demultiplexer circuit 3. This sampler and demultiplexer circuit 3 converts the I.F. signal into a digital I.F. signal and splits this digital I.F. signal into two channels wherein one channel corresponds to the even samples of the digital I.F. signal and the other channel corresponds to the odd samples of the digital I.F. signal. The even channel and odd channel containing the digital I.F. signals are connected into a Finite Impulse Response (FIR) filter 5. This FIR filter 5 performs a Hilbert transform upon both the even channel and odd channel signals. These transform signals are then inputted into a digital differential phase-shift keyed demodulator 4 which multiplies and sums both the even and odd channels to determine the differential phase-shift keyed data associated with the I.F. signal. This differential phase-shift keyed data is decoded to produce a data stream useful for formulating Mode S reply transmission as an example.

The received signal is inputted in a parallel fashion into a Mode S preamble detector 11, a Mode A detector 17, and a Mode C detector 19. These detectors, 11, 17 and 19, determine the type of preamble being received by the receiver.

If the preamble detector identifies an ATCRBS Mode A interrogation, the Mode A detector 17 transmits a signal to a CPU 9 to inform the CPU 9 that a Mode A signal has been received. Likewise, if the received signal is identified as a Mode C interrogation, the Mode C detector 19, transmits a signal to the CPU 9 informing the CPU 9 that a Mode C signal has been received. However, if the received signal is a Mode S preamble, the Mode S preamble detector 11 transmits a preamble detection signal to a sync phase reversal detector 13. The identification of the Mode A or Mode C signal is necessary in a Mode S system to enable the Mode S system to function in the Mode A or Mode C (ATCRBS) signal environment.

Upon receiving the preamble detection signal, the sync phase reversal detector 13 monitors the output from the Finite Impulse Response (FIR) filter 5 to determine whether a sync phase reversal signal has been transmitted within a predetermined window or time period. The sync phase reversal detector 13, upon detection of the sync phase reversal signal, activates a clock 15 to produce clock signals utilized by the FIR filter 5 and the digital differential phase-shift keyed demodulator 4.

Figure 2:
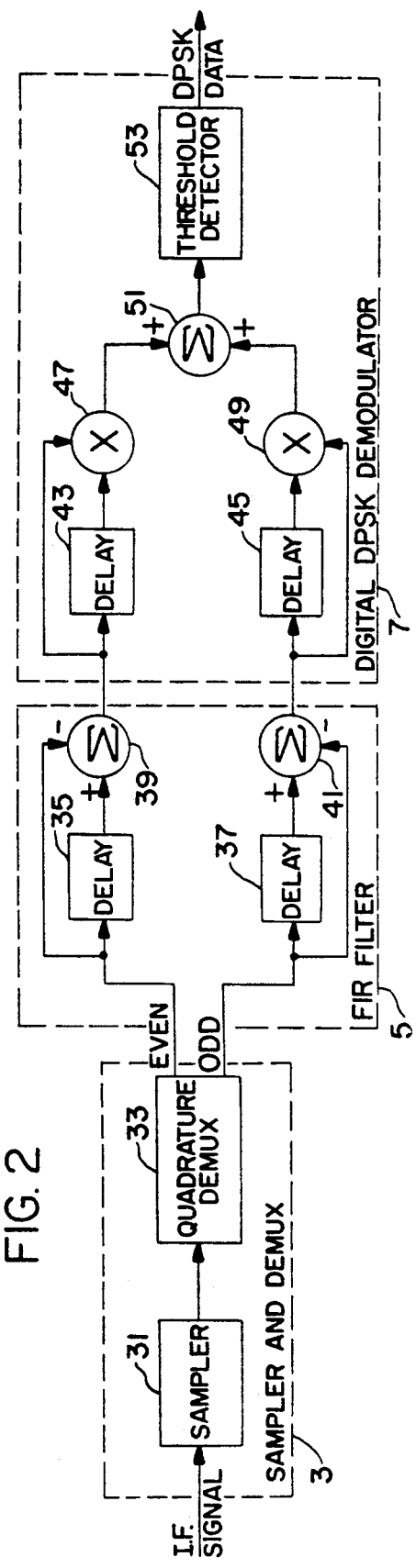
FIG. 2 illustrates the digital Mode S uplink processing system utilizing one preferred embodiment of the digital differential phase-shift keyed demodulator.

FIG. 2 illustrates the digital Mode S processing system which utilizes a preferred embodiment of the digital differential phase-shift keyed demodulator 4. In this digital Mode S processing system, the I.F. signal is inputted into a sampler 31 which converts the analog I.F. signal into a digital I.F. signal. The digital I.F. signal is then inputted into a quadrature demultiplexer 33 which splits the digital I.F. signal into even and odd samples to be transmitted over two separate channels. These even and odd samples are inputted into delay circuits, 35 and 37, respectively. These even and odd samples are also inputted into difference circuits, 39 and 41, respectively. The output from the delay circuits, 35 and 37, are also inputted into the difference circuits, 39 and 41, respectively. In the difference circuit 39, a current even sample is subtracted from the delayed even sample with the difference being inputted into a delay circuit 43. In the difference circuit 41, the current odd sample is subtracted from the delayed odd sample wherein the difference is inputted into a delay circuit 45. The even sample difference is also inputted into a multiplier 47 while the odd sample difference is also inputted into a multiplier 49. The outputs from the delay circuits, 43 and 45, are inputted into the multipliers, 47 and 49, respectively. The products from the multipliers, 47 and 49, are inputted into an adding 51. The summation from this adding circuit 51 is inputted into a threshold detector 53 which determines the actual differential phase-shift keyed data from the polarity of the summation.

In one embodiment of the present invention, the threshold detector extracts the sign bit from the summation to determine the polarity of the summation such that logic data "1" is outputted when the polarity of the summation is positive and logic "0" data is outputted when the polarity of the summation is negative. Alternatively, the outputs from the multipliers 47 and 49 may be applied to a twos compliment comparator to determine the actual differential phase-shift keyed data.

Figure 3:
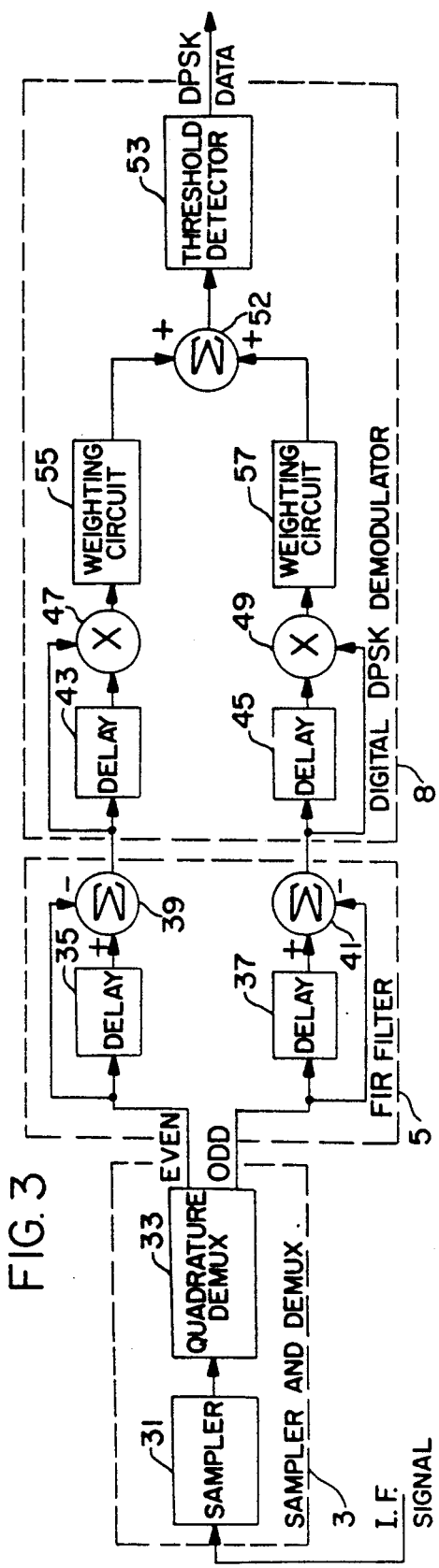
FIG. 3 illustrates the digital Mode S uplink processing system utilizing another preferred embodiment of a digital differential phase-shift keyed demodulator.

FIG. 3 illustrates the digital Mode S processing system which utilizes another preferred embodiment of the digital differential phase-shift keyed demodulator 4. In this digital Mode S processing system, the I.F. signal is inputted into a sampler 31 which converts the analog I.F. signal into a digital I.F. signal. The digital I.F. signal is then split into even and odd samples by a quadrature demultiplexer 33 to be transmitted over to separate channels.

These even and odd samples are inputted into delay circuits, 35 and 37, respectively. These even and odd samples are also inputted into subtractor, 39 and 41, respectively. The output from the delay circuits, 35 and 37, are also inputted into the subtractors, 39 and 41, respectively. In the subtractor 39, a current even sample is subtracted from the delayed even sample with the difference being inputted into a delay circuit 43. In the subtractor 41, the current odd sample is subtracted from the delayed odd sample wherein the difference is inputted into a delay circuit 45. The even sample difference is also inputted into a multiplier 47 while the odd sample difference is also inputted into a multiplier 49. The outputs from the delay circuits, 43 and 45, are inputted into the multipliers, 47 and 49, respectively. The products from the multipliers, 47 and 49, are inputted into weighting circuits, 55 and 57, respectively. These weighting circuits cause the middle samples from the product phase detector to be given greater weight with respect to the remaining samples to avoid degradation of the Mode S signal cause by interference at either edge of the passband of the Mode S signal. The results from these weighting circuits, 55 and 57, are inputted into a summer 52. The summation of summer 52 is inputted into a threshold detector 53 which determines the actual differential phase-shift keyed data.

In one embodiment of the present invention, the threshold detector extracts the sign bit from the summation to determine the polarity of the summation such that logic data "1" is outputted when the polarity of the summation is positive and logic "0" data is outputted when the polarity of the summation is negative. Alternatively, the outputs from the multipliers 47 and 49 may be applied to a twos compliment comparator to determine the actual differential phase-shift keyed data.

Figure 4:
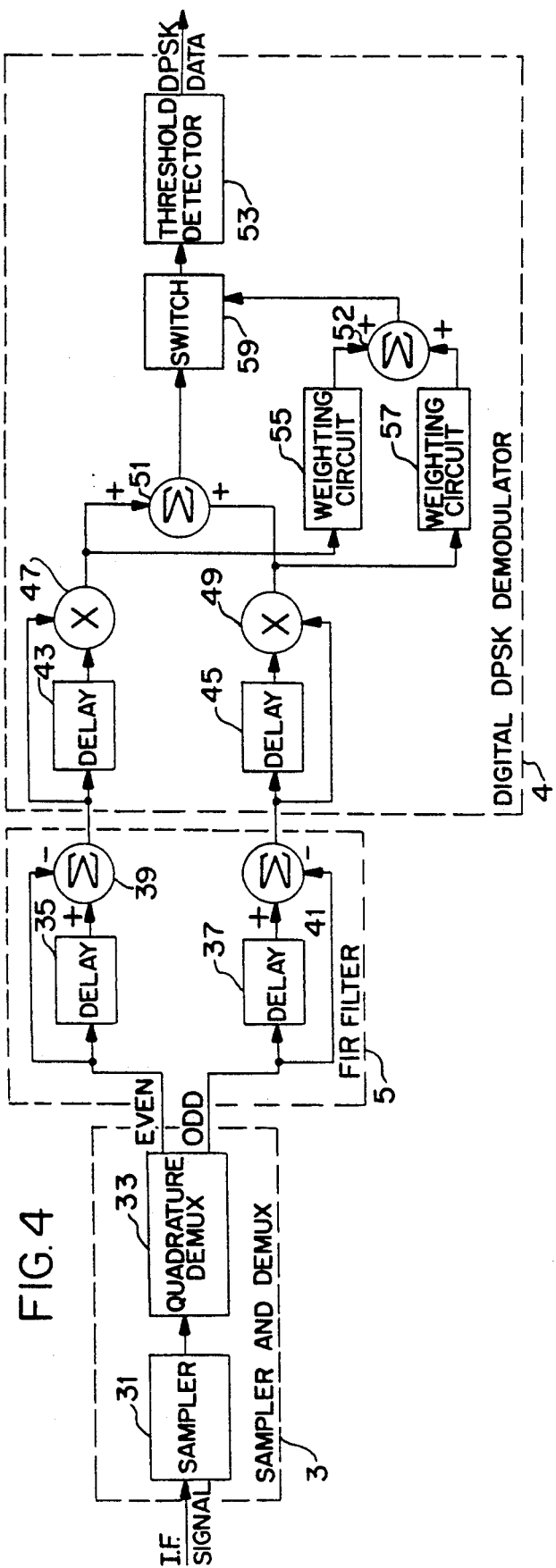
FIG. 4 illustrates a third preferred embodiment of a digital differential phase-shift keyed demodulator in the digital Mode S uplink processing system of the present invention.

FIG. 4 illustrates a digital Mode S processing system which utilizes a third preferred embodiment of a digital differential phase-shift keyed demodulator. In this digital Mode S processing system, the I.F. signal is inputted into a sampler 31 which converts the analog I.F. signal into a digital I.F. signal. The digital I.F. signal is then inputted into a quadrature demultiplexer which splits the digital I.F. signal into even and odd symbols to be transmitted over two separate channels. These even and odd samples are inputted into delay circuits, 35 and 37, respectively. These even and odd samples are also inputted into difference circuits, 39 and 41, respectively. The output from the delay circuits, 35 and 37, are also inputted into the difference circuits, 39 and 41, respectively. In the difference circuit 39, a current even sample is subtracted from the delayed even sample with the difference being inputted into a delay circuit 43. In the difference circuit 41, the current odd sample is subtracted from the delayed odd sample wherein the difference is inputted into a delay circuit 45. The even sample difference is also inputted into a multiplier 47 while the odd sample difference is also inputted into a multiplier 49. The outputs from the delay circuits, 43 and 45, are inputted into the multipliers, 47 and 49, respectively.

The products from the multipliers, 47 and 49, are inputted into weighting circuits, 55 and 57, respectively. These weighting circuits cause the middle samples from the product phase detector to be given greater weight than the remaining samples to avoid degradation of the Mode S signal cause by interference at either edge of the passband of the Mode S signal. The weighting circuits, 55 and 57, weight the products from the multipliers, 47 and 49, such that the middle samples are given greater weight. Results from the weighting circuits, 55 and 57, are inputted to a summer 52. The products from the multipliers, 47 and 49, are also inputted into a summer 51. The summations from summers, 51 and 52, are inputted into a switch 59. This switch 59 selects either the summation from summer 51 or the summation from summer 52 depending on the noise or interference detected in the Mode S signal. If the degradation of the Mode S signal is caused by broadband additive noise, the summation from summer 51 is selected by switch 59 to be inputted into a threshold detector 53. Alternatively, if the degradation of the Mode S signal is caused by interference at either edge of the passband of the Mode S signal, the summation from summer 52 is selected by switch 59 to be inputted into the threshold detector 53. The threshold detector 53 determines the actual differential phase-shift keyed data from the selected sum.

In one embodiment of the present invention, the threshold detector extracts the sign bit from the summation to determine the polarity of the summation such that logic data "1" is outputted when the polarity of the summation is positive and logic "0" data is outputted when the polarity of the summation is negative. Alternatively, the outputs from the multipliers 47 and 49 may be applied to a twos compliment comparator to determine the actual differential phase-shift keyed data.

Figure 5:
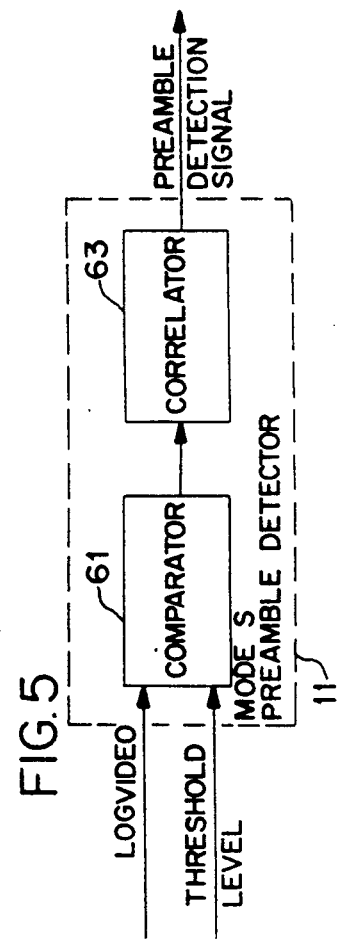
FIG. 5 illustrates the preamble detector of the digital Mode S processing system of the present invention.

FIG. 5 illustrates the preamble detector of the digital Mode S processing system. The Mode S preamble detector 11 receives a logvideo signal and a reference threshold level signal. The received logvideo and reference threshold level signals are inputted into a comparator 61. Comparator 61 then determines whether the received logvideo signal has a higher voltage level than the reference threshold level signal. As a result of this comparison, the comparator 61 outputs a pulse signal when the logvideo signal has a higher level than the reference threshold level signal. This pulse signal produced by the comparator 61 is inputted into a correlator 63. The correlator 63 then analyzes the received pulse signals from the comparator 61 to determine if the detected signal is actually the preamble of the Mode S signal. Upon determining that the detected signal is the preamble of a Mode S signal, the correlator 63 produces a preamble detection signal which is inputted into the sync phase reversal detector 13. The reference threshold level signal may be a predetermined signal which is set at a distinct level. Alternatively, the reference threshold level signal may be a programmable signal which level can be varied by the onboard CPU 9.

FIGS. 6(a)-6(g) illustrate the timing diagram of the processing of a Mode S signal utilizing the digital Mode S uplink processing system of the present invention. These Figures will be more fully discussed below with respect the discussion of the actual operations of the present invention.

Figure 7:
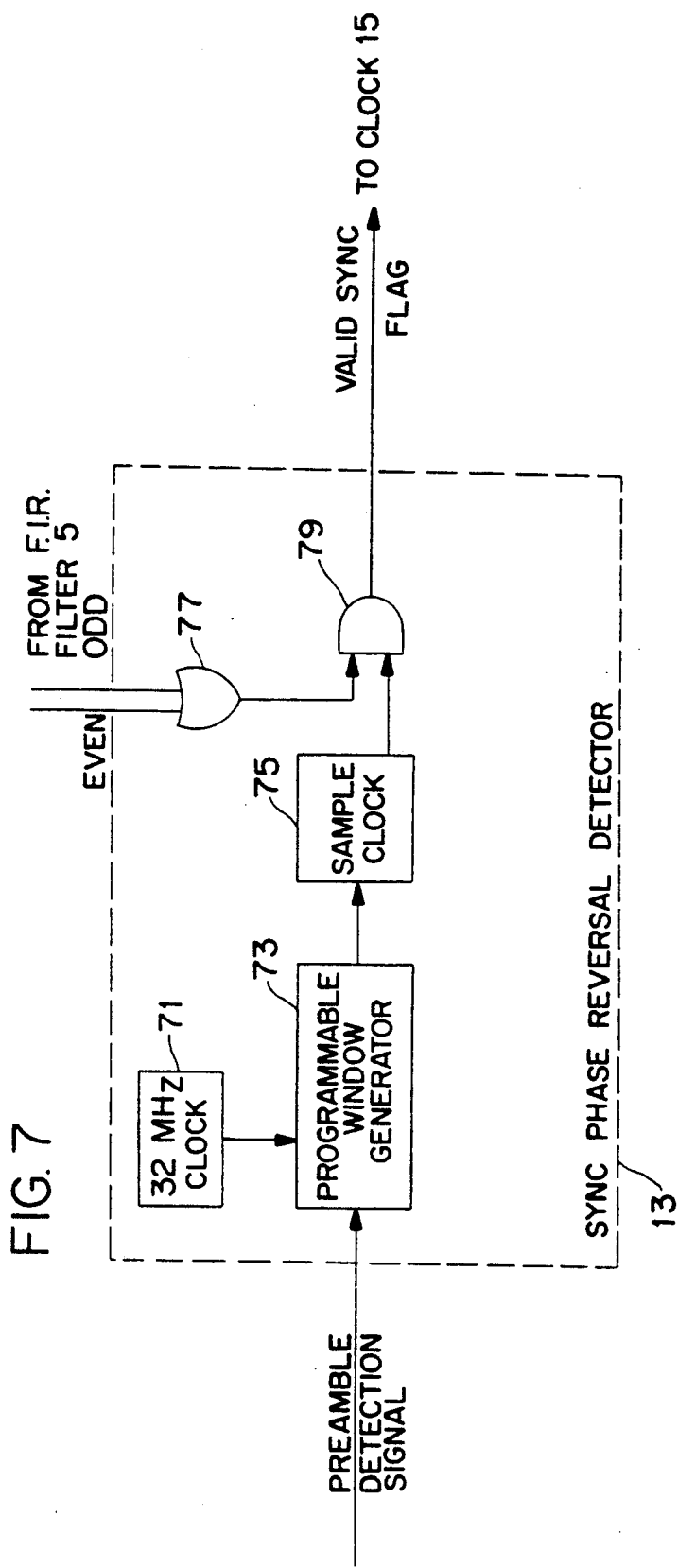
FIG. 7 is a detailed circuit drawing of one embodiment of the sync phase reversal detector of the present invention.

FIG. 7 illustrates, in detail, one embodiment of a sync phase reversal detector 13 utilized in the present invention. The sync phase reversal detector 13 includes a programmable window generator 73 which receives the preamble detection signal from the Mode S preamble detector 11. The programmable window generator 73 is also connected to a clock 71 which produces a 32 MHz signal. From the clock signal and the preamble detection signal, the programmable window generator 73 produces a pulse signal having a programmable width which activates a sample clock 75 for a certain period of time. The sample clock 75 is connected to one input of a logic AND gate 79. The other input of the AND gate 79 is connected to an output of a logic OR gate 77. The inputs of the OR gate 77 are connected to the FIR filter 5 to receive both the even and odd samples of the received signal. In this embodiment, a phase reversal is represented by a binary one or high logic. This binary one is passed through the OR gate 77 to the AND gate 79. If the signal (a logic high signal) from the sample clock 75 is coincidence with the a logic high output from the OR gate 77, the AND gate 79 produces a valid sync flag which informs the Mode S system to prepare to receive DPSK data. In the preferred embodiment of the present invention, as shown in FIG. 1, the clock 71 and sample clock 75 constitute a single variable clock represented by item 15 in FIG. 1. This clock 15 is capable of producing the different frequencies as described above and can be readily implemented by one of ordinary skill in the art.

OPERATION OF THE PRESENT INVENTION

One operation of the present invention embody the concepts for receiving and demodulating a Mode S uplink signal in either a transponder or an air collision avoidance system. This Mode S uplink signal is produced by a Mode S sensor located on the ground, or alternatively, the Mode S interrogation signal may be produced from another aircraft in the vicinity of the receiving aircraft equipped with an active TCAS device capable of Mode S interrogation.

Upon receiving this transmitted Mode S signal, the I.F. amplifier within the receiver 1 amplifies this signal and down converts this signal from its preferred frequency of 1030 MHz. From this process, the receiver 1 outputs a linear output signal (the I.F. signal) and a logarithm video (log video) signal which is related to the detection envelope of the 1030 MHz signal.

To determine whether the received signal is a Mode S signal or a signal of the type, Mode A or Mode C, the log video signal is inputted into a Mode S preamble detector 11. The Mode S preamble detector 11 begins the process of determining whether the received uplink signal is a Mode S signal wherein the determination relies on the conjunction of two separate events. The first event consists of detecting the preamble that is characteristic of a Mode S signal while the second event is the detecting of a sync phase reversal of the incoming signal within a predetermined time window after the detection of the preamble.

Figure 6:
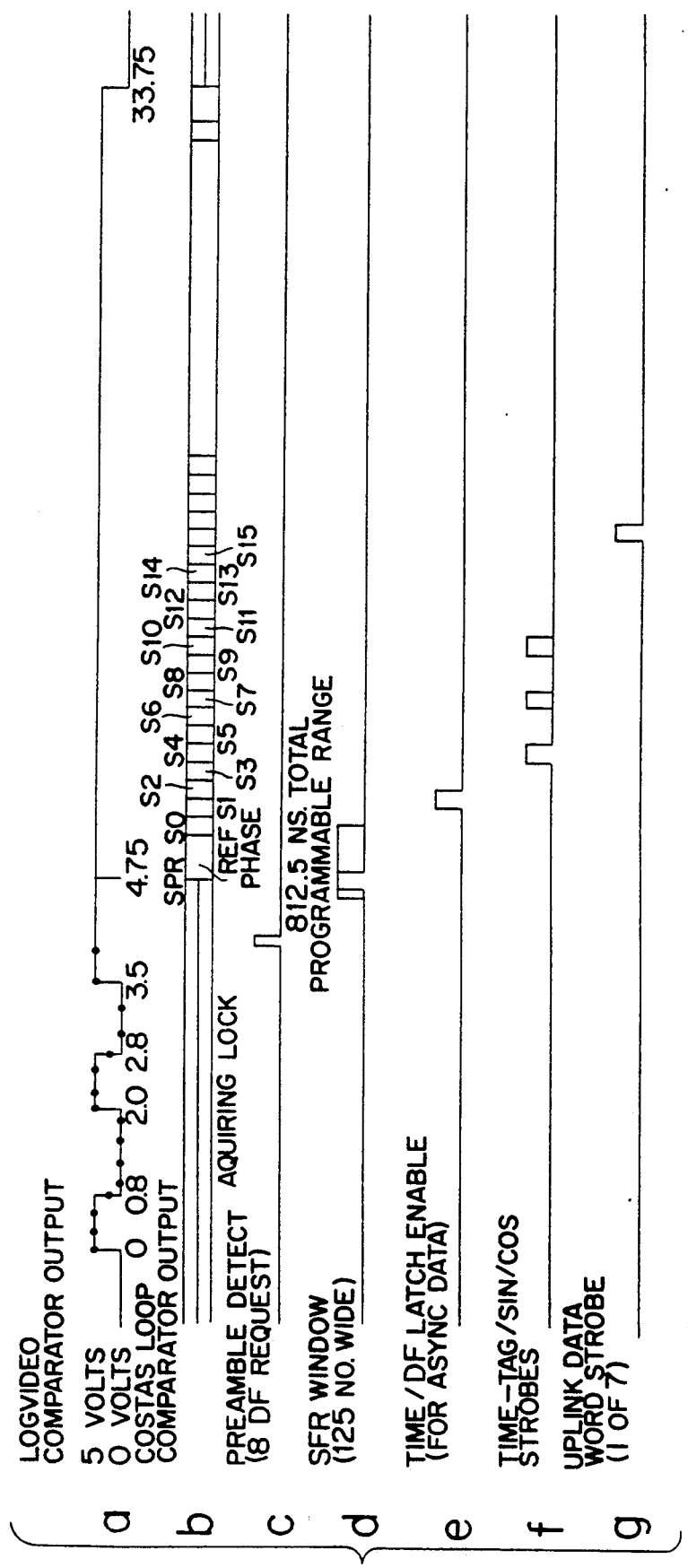
FIGS. 6(a)-6(g) illustrate the timing diagrams for recognizing the transmitted Mode S signal and the actual demodulation of the information contained in the transmitted Mode S signal.

To detect the preamble of the Mode S signal, the log video signal is applied to a comparator 61 as shown in FIG. 5. This comparator generates a binary data stream as shown in FIG. 6(a). The output of the comparator 61 is logic "1" data when the logvideo voltage is greater than a specified threshold voltage level and is logic "0" when the logvideo voltage is less than a specific threshold voltage level. As discussed above, this threshold voltage level can be programmable by the CPU 9 to adjust the sensitivity of the detection of the preamble of the Mode S signal. This threshold voltage can be supplied to the comparator 61 from the CPU 9 by use of a digital-to-analog converter. The preamble is detected by correlating the binary data stream as shown in FIG. 6(a) with a template function which is stored in the correlator 63 of FIG. 5. In the preferred embodiment of the present invention, the template function checks 64 samples to determine if the checked samples correspond to a predetermined set of samples. Such a template function can be readily implemented by one of ordinary skill in the art. The correlator 63 produces a one-bit flag when the template function produces a score equal to or exceeding a predetermined threshold, for example, in a preferred embodiment of the present invention, a correlation score of 60 out of 64 samples would produce a one-bit flag. In other words, the correlator 63 and the template are implementing a "matched filter" for the Mode S preamble envelope.

The producing of the one-bit flag is shown in FIG. 6(c). Upon receiving the preamble signal, a sync phase reversal detector 13 of FIG. 1, creates a time window in which a sync phase reversal must be found. This sync phase reversal detector is programmable such that the range of the time window is programmable within the range of 0 to 812.5 nanoseconds. To determine whether the sync phase reversal occurs during this time window, the sync phase reversal detector 13 monitors the I.F. signal being outputted from the finite impulse response filter 5 of FIG. 1. This operation is readily observed in studying FIG. 7.

The sync pulse is defined to be the first phase reversal within P6 (of the Mode S interrogation). The spacing between P2 to the sync phase reversal is 2.75 microseconds plus or minus 0.5 microseconds. The spacing between P6 and the sync phase reversal is 1.25 microseconds plus or minus 0.5 microseconds. Sync detection is realized by searching for a phase reversal (binary one) event within a window, for example, 1.25 microseconds, plus or minus 0.5 microseconds from the leading edge of P6. This example can be accomplished by the circuit illustration in FIG. 7.

The sync phase reversal detector 13 also controls a clock 15 so that the I.F. signal is sampled at a clock rate of 32 MHz.

The method utilized by the sync phase reversal detector can best be understood with the following equations (where S0, S1, ... S4 are samples of the I.F. signal taken at a rate of $F_S$ equal $F_{I.F.}/(n \pm \frac{1}{4})$ with n being a positive integer):

$W = S2*S0 + S3*S1$ $Z = S3*S1 + S4*S2$

W and Z are estimates of the modulation term (a scaler number) at time 3 (S3) and time 4 (S4) respectively, wherein both W and Z must be computed in a single sampling period (1/$F_S$=62.4 nanoseconds).

Therefore, the multiplications required for W must be performed in 31.25 nanoseconds and the two multiplications required for Z must occur in the next 31.25 nanoseconds (32 MHz). W and Z are calculated by using normal sum of products operations well known to those of ordinary skill in the art. Both terms are generated by the same phase demodulation method that operations as follows:

If no phase reversal occurs in a sampled sine wave where samples are spaced ninety degrees apart, then:

S0 = sin(x),
S1 = cos(x)
S2 = −sin(x),
S3 = −cos(x)
S4 = sin(x).

All samples S(i)+j S(i+1) form complex numbers. From these numbers, a measurement of the I.F. signals amplitude and phase can be determined. In the case of determining phase reversal, only phase is important. Given two vectors V1 and V2, a third vector V3 with amplitude equal to V1×V2 and angle equal to angle (V2) − angle (V1) is generated by V3 = V2 × V1* where V1* is the conjugate of V1. If V2 is inphase with V1, i.e., no phase shift, V3 lies on the positive x axis and the real term is greater than zero. If V1 is out of phase, i.e., 180 degree phase shift, V3 lies on the negative x axis and the real term is less than zero. The equations $W = S2*S0 + S3*S1$ and $Z = S3*S1 + S4*S2$ are the real, x axis, components of the $V2 \times V1*$ equation.

A modulation decision boundary is formed by the Y axis which divides the XY plane into two halves. The decision can be based on the sign of the real (x axis) term of the complex modulation vector. This function limits the modulation signal and is the output of the phase shift demodulator. W and Z are limited to provide a one bit modulation signal.

In the preferred embodiment of the present invention, when the proper sync phase reversal signal is received, as shown in FIG. 6(c), a Mode S verification signal is produced as shown in FIG. 6(e) to indicate to the digital differential phase-shift keyed demodulator to start processing the I.F. signal. The digital Mode S uplink processing system operates by sampling the I.F. signal with a sampler 3 as shown in FIG. 1.

The sampling frequency, FS, may, in the preferred embodiment, be chosen so the following relation is true:

$$F_0 = (n \pm \tfrac{1}{4}) * F_S$$

where $F_0$ is the center frequency of the I.F. amplifier located in the receiver 1 and n is a non-negative integer. The even and odd samples, which are intrinsically time division multiplex, are demultiplexed by the sampler and demultiplexer 3 of FIG. 1 into two channels of even and odd samples wherein the even samples correspond to the n-phase signal and the odd samples correspond to the quadrature signal. This demultiplexing operation is implemented by sequentially latching the even and odd samples into the individual channel latches.

The samples in each of the channels are individually inputted to identical finite impulse response (FIR) filters 5 consisting of a unit delay in a subtractor. The unit delay corresponds to a time period of 2/FS. The outputs from each of the FIR filters 5, which have been computed at a rate of $F_S/4$, are individually inputted to the product phase detecting circuits consisting of a unit delay and a multiplier. This unit delay in the product phase detector circuit is one sample of the demultiplex data rate, thereby corresponding to a time difference of $4F_S$. The digital Mode S processing system data detection function is performed by adding the outputs from the two delay-and-multiply phase detector circuits and extracting a sign bit from this sum.

Upon determining the polarity of the sum, a threshold detector 53 within the digital differential phase-shift keyed demodulator 7 outputs logic "1" when the polarity of the sum is positive and outputs logic "0" when the polarity of the sum is negative as shown in FIG. 6(b). Alternatively, the two delay-and-multiply detector outputs may be applied to a two's compliment comparator to perform a two's compliment comparison to generate the same digital data.

The digital demodulation process of the present invention incorporates two distinct modulation methods for processing the differential phase-shift keyed signals and a method for selecting either of these methods. These distinct methods are utilized to compensate for the noise or interference normally received along with the Mode S signal. In a first method, as demonstrated in FIG. 2, the digital differential phase-shift keyed demodulator is configured so that a degradation of the Mode S signal due to broadband additive noise is avoided. This method will be discussed in more detail below. In the second method, as illustrated in FIG. 3, the degradation of the Mode S signal due to the interference at either edge of the passband of the Mode S signal is avoided. This method will be discussed in more detail below.

To implement the first method, the present invention utilizes a complex match filter followed by a product phase detector. The complex match filter corresponds to the finite impulse response filter 5 of FIG. 2 which is actually a pair of filters that operate on the in-phase (even) in the quadrature (odd) samples of the input signal. Four samples in each channel for a baud interval is taken so that the combined filtering and phase detection operation can be written in expanded form as:

$$\text{Sign}(S4*S0 + S6*S2 - S6*S0 - S4*S2 + S5*S1 + S7*S3 - S7*S1 - S5*S3).$$

These eight samples are taken over a two-baud interval as represented by S0-S7.

In the second method, the addition of a weighting process is added to avoid the interference at either edge of the passband of the Mode S signal. To implement this method, after being processed by the product phase detector circuit, the products are inputted into weighting circuits, 55 and 57, as demonstrated in FIG. 3. The weighted product phase detector outputs are then summed by an accumulator 52 to produce a signal represented by the following equation:

$$F4*F0 + 2*S5*S1 + 2*S6*S2 + S7*S3.$$

In this method, the weighting of the two middle terms of this equation allows the digital demodulation to rely more heavily upon the middle two samples of each baud thereby avoiding the interference at either edge of the passband of the Mode S signal. -As discussed above, the polarity of this sum is utilized by the threshold detector 53 to determine the logical output to the onboard CPU.

To determine which method is utilized to digitally demodulate the Mode S signal, the present invention make a decision based upon the strength of the signal. Selection of the A or B algorithm can be based on the P1, P2, or P6 amplitude. The selection threshold will be a constant. Thus, depending upon the relationship of the amplitude to the threshold, the algorithm will be selected. This algorithm is latched and will not change until a new AP1, P2, or P6 is detected. Algorithm A is utilized in a low signal to noise environment because Algorithm A is unweighted and will provide marginally better performance in this environment. Algorithm B is utilized in an environment having a relatively higher signal to noise threshold (in comparison to the environment for A) because Algorithm B is weighted to give a better bit error performance.

In the preferred embodiment of the present invention, the digital Mode S signal processing system processes the received signal with respect to an intermediate frequency (I.F.) of an I.F. amplifier. This I.F. signal is digitized by a flash analog-to-digital (A/D) converter represented by sampler 31. The digitization utilizes "subsampling" of the I.F. signal according to the relation:

$$F_{I.F.} = (N \pm \tfrac{1}{4}) * F_s$$

where $F_{I.F.}$ is the center frequency of the I.F. amplifier, Fs is the A/D sampling frequency and N is a positive integer. A typical I.F. center frequency of 60 MHz is commensurate with a sampling frequency of 16 MHz. Since the Mode S signal has a bitrate of 4 million bits per second (Mbps), the result is four samples per bit and eight samples for a two bit interval.

These A/D samples, in the preferred embodiment, are processed by a TRW TMC2249 "CMOS DIGITAL MIXER" or an equivalent part of component which implements one of the two demodulation methods described above. The selection of the method is controlled by a programmable logic device (PLD). Either method is implemented as a sum of products of samples taken over a two baud (bit) interval resulting in a simple control logic designable to one of ordinary skill in the art.

Other approaches to this demodulation process can be implemented. For example, a full Hilbert transformer can be used rather than use of the quadrature demultiplexer 33. Also, for example, the complex matched filter and the detector can be implemented separately, rather than combine these calculations using a sum of products.

In the above-described embodiments of the present invention, it is apparent that the present invention may be modified as would occur to one of ordinary skill in the art without departing from the spirit and scope of the present invention which should be defined solely by the appended claims. Changes and modifications to the system contemplated by the present preferred embodiments will be apparent to one of ordinary skill in the art.

What is claimed is:

1. A digital Mode S Interrogation Signal Processor for implementation in either a Mode S transponder or air collision avoidance system, comprising:

Mode S preamble detector means for detecting a Mode S preamble of a transmitted signal and for generating a preamble detection signal;
   phase-shift reversal detection means, in response to said preamble detection signal, for detecting a phase shift reversal in the transmitted signal and for generating a Mode S verification signal; and
   said phase-shift reversal detection means determining that the transmitted signal is a Mode S signal when generating said Mode S verification signal;
   digital differential phase-shift keyed demodulating means, in response to said Mode S verification signal, or digitally demodulating said Mode S signal to obtain useful information for air collision avoidance.

2. The digital Mode S Interrogation Signal Processor as claimed in claim 1, wherein said digital differential phase-shift keyed demodulating means comprises:

splitter means for splitting said Mode S signal into a quadrature signal and an in-phase signal, said quadrature signal being odd samples of said Mode S signal and said in-phase signal being even samples of said Mode S signal;
   digital Hilbert transformation means, operatively connected to said splitter means, for performing a Hilbert transformation upon said quadrature signal and said in-phase signal to produce transformed signals;
   delay means, operatively connected to said digital Hilbert transformation means, for delaying the transformed quadrature and in-phase signals by one clock cycle;
   multiplying means, operatively connected to said delay means, for multiplying the delayed transformed quadrature signal with a current transformed quadrature signal and for multiplying the delayed transformed in-phase signal by a current transformed in-phase signal;
   summer means, operatively connected to said multiplying means, for summing the products produced by said multiplying means; and
   threshold means, operatively connected to said summer means, for determining a polarity of the sum produced by said summer means.

3. The digital Mode S Interrogation Signal Processor as claimed in claim 2, wherein said digital Hilbert transform means comprises:

Hilbert delay means, operatively connected to said splitter means, for delaying said quadrature signal and said in-phase signal by one clock cycle;
   first subtractor means, operatively connected to said Hilbert delay means and said delay means, for subtracting a current quadrature signal from the delayed quadrature signal to produce the transformed quadrature signal; and
   second subtractor means, operatively connected to said Hilbert delay means and said delay means, for subtracting a current in-phase signal from the delayed in-phase signal to produce the transformed in-phase signal.

4. The digital Mode S Interrogation Signal Processor as claimed in claim 2, wherein said threshold means produce data having a logic "1" when said polarity is positive and a logic "0" when said polarity is negative.

5. The digital Mode S Interrogation Signal Processor as claimed in claim 1, further comprising:

clock means, operatively connected to said phase shift reversal detector means and said digital differential phase shift keyed demodulator means, for producing a clock signal for said digital differential phase shift keyed demodulator in response to the detected phase shift reversal.

6. The digital Mode S Interrogation Signal Processor as claimed in claim 5, wherein said clock means produces a clock signal having a frequency of 16 MHz during a digital demodulation process.

7. The digital Mode S Interrogation Signal Processor as claimed in claim 1, wherein said Mode S preamble detector comprises:

comparator means, for comparing a voltage level of the transmitted Mode S signal with a reference threshold level to produce a pulse when said voltage level exceeds said reference threshold level; and
   correlator means, operatively connected to said comparator means, for determining if said comparator means has produced two pulses and if said two pulses are separated by predetermined time gap;
   said correlator means, producing preamble detection signal when said two pulses are present and are separated by said predetermined time gap.

8. The digital Mode S Interrogation Signal Processor as claimed in claim 7, wherein said reference threshold level is programmable.

9. The digital Mode S Interrogation Signal Processor as claimed in claim 4, further comprising:

computer means, operatively connected to said threshold means, for receiving serially said data produced by said threshold means and for using said data to avoid collisions with other moving objects.

10. The digital Mode S Interrogation Signal Processor as claimed in claim 1, further comprising:

Mode C means for processing and identifying a Mode C signal.

11. The digital Mode S Interrogation Signal Processor as claimed in claim 1, further comprising:
   Mode A means for processing and identifying a Mode A signal.

12. The digital Mode S Interrogation Signal Processor as claimed in claim 2, wherein said multiplying means comprises:
   first multiplying means, operatively connected to said delay means, for multiplying the delayed transformed quadrature signal with a current transformed quadrature signal;
   second multiplying means, operatively connected to said delay means, for multiplying the delayed transformed in-phase signal with a current in-phase signal; and
   weighting means, operatively connected to said summer means, said first and said second multiplying means, for arithmatically weighing the products from said first and second multiplying means such that middle samples of the transmitted signal are given greater weight, thereby avoiding interference at either edge of a passband of said Mode S signal.

13. The digital Mode S Interrogation Signal Processor as claimed in claim 12, wherein eight samples of the transmitted signal produce one bit of data.

14. The digital Mode S Interrogation Signal Processor as claimed in claim 1, wherein said digital differential phase-shift keyed demodulating means comprises:
   splitter means for splitting said Mode S signal into a quadrature signal and an in-phase signal, said quadrature signal being odd samples of said Mode S signal and said in-phase signal being even samples of said Mode S signal;
   digital Hilbert transformation means, operatively connected to said splitter means, for performing a Hilbert transformation upon said quadrature signal and said in-phase signal to produce transformed signals;
   delay means, operatively connected to said digital Hilbert transformation means, for delaying the transformed quadrature and in-phase signals by one clock cycle;
   multiplying means, operatively connected to said delay means, for multiplying the delayed transformed quadrature signal with a current transformed quadrature signal and for multiplying the delayed transformed in-phase signal by a current transformed in-phase signal;
   weighting means, operatively connected to said multiplying means, for arithmatically weighing the products from said multiplying means such that middle samples of the transmitted signal are given greater weight;
   first summer means, operatively connected to said multiplying means, for summing the products produced by said multiplying means;
   second summer means, operatively connected to said weighting means, for summing the weighted products produced by said weighting means;
   switch means, operatively connected to said first and second summer means, for selecting a sum from either said first or second summer means in accordance with a type of noise and interference present in the transmitted signal; and
   threshold means, operatively connected to said switch means, for determining a polarity of the selected sum from said switch means.

15. The digital Mode S Interrogation Signal Processor as claimed in claim 14, wherein eight samples of the transmitted signal produce one bit of data.

16. A Mode S Interrogation Signal Processor for collision avoidance system, comprising:
   Mode S signal detector means for determining if a received signal is a Mode S signal;
   splitter means, operatively connected to said Mode S signal detector means, for splitting a transmitted Mode S signal into a quadrature signal and an in-phase signal, said quadrature signal being odd-samples of said transmitted Mode S signal and said in-phase signal being even samples of said transmitted Mode S. signal;
   digital Hilbert transformation means, operatively connected to said splitter means, for performing a Hilbert transformation upon said quadrature signal and said in-phase signal to produce transformed signals;
   delay means, operatively connected to said digital Hilbert transformation means, for delaying the transformed quadrature and in-phase signals by one clock cycle;
   multiplying means, operatively connected to said delay means, for multiplying the delayed transformed quadrature signal with a current transformed quadrature signal and for multiplying the delayed transformed in-phase signal by a current transformed in-phase signal;
   summer means, operatively connected to said multiplying means, for summing the products produced by said multiplying means; and
   threshold means, operatively connected to said summer means, for determining a polarity of the sum produced by said summer means.

17. The digital Mode S Interrogation Signal Processor as claimed in claim 16, wherein said threshold means produce data having a logic "1" when said polarity is positive and a logic "0" when said polarity is negative.

18. The Mode S Interrogation Signal Processor as claimed in claim 16, wherein said digital Hilbert transform means comprises:
   Hilbert delay means, operatively connected to said splitter means, for delaying said quadrature signal and said in-phase signal by one clock cycle;
   first subtractor means, operatively connected to said Hilbert delay means and said delay means, for subtracting a current quadrature signal from the delayed quadrature signal to produce the transformed quadrature signal; and
   second subtractor means, operatively connected to said Hilbert delay means and said delay means, for subtracting a current in-phase signal from the delayed in-phase signal to produce the transformed in-phase signal.

19. The Mode S Interrogation Signal Processor as claimed in claim 16, wherein said Mode S signal detector means comprises:
   comparator means, for comparing a voltage level of the transmitted signal with a threshold level to produce a pulse when said voltage level exceeds said threshold level; and
   correlator means, operatively connected to said comparator means, for determining if said comparator means has produced two pulses and if said two pulses are separated by predetermined time gap;
   said correlator means, producing a preamble detector signal when said two pulses are present and are separated by said predetermined time gap, thereby indicating that a Mode S signal is being received.

20. The Mode S Interrogation Signal processor as claimed in claim 16, further comprising:
computer means, operatively connected to said threshold means, for receiving serially said data produced by said threshold means and for using said data to avoid collisions with other moving objects.

21. The Mode S Interrogation Signal Processor as claimed in claim 16, further comprising:
Mode C means for processing and identifying a Mode C signal.

22. The Mode S Interrogation Signal Processor as claimed in claim 16, further comprising:
Mode A means for processing and identifying a Mode A signal.

23. The Mode S Interrogation Signal Processor as claimed in claim 16, wherein said multiplying means comprises:
first multiplying means, operatively connected to said delay means, for multiplying the delayed transformed quadrature signal with a current transformed quadrature signal;
second multiplying means, operatively connected to said delay means, for multiplying the delayed transformed in-phase signal with a current in-phase signal; and
weighting means, operatively connected to said summer means, said first multiplying means and said second multiplying means, for arithmatically weighing the products from said first and second multiplying means such that middle samples of the transmitted signal are given greater weight, thereby avoiding interference at either edge of a passband of said Mode S signal.

24. The digital Mode S Interrogation Signal Processor as claimed in claim 23, wherein eight samples of the said Mode S signal produce one bit of data.

25. A Mode S Interrogation Signal Processor for collision avoidance system, comprising:
splitter means, operatively connected to said Mode S signal detector means, for splitting a transmitted Mode S signal into a quadrature signal and an in-phase signal, said quadrature signal being odd-samples of said Mode S signal and said in-phase signal being even samples of said Mode S signal;
digital Hilbert transformation means, operatively connected to said splitter means, for performing a Hilbert transformation upon said quadrature signal and said in-phase signal to produce transformed signals;
delay means, operatively connected to said digital Hilbert transformation means, for delaying the transformed quadrature and in-phase signals by one clock cycle;
multiplying means, operatively connected to said delay means, for multiplying the delayed transformed quadrature signal with a current transformed quadrature signal and for multiplying the delayed transformed in-phase signal by a current transformed in-phase signal;
weighting means, operatively connected to said multiplying means, for arithmatically weighing the products from said multiplying means such that middle samples of the transmitted signal are given greater weight;

first summer means, operatively connected to said multiplying means, for summing the products produced by said multiplying means;
second summer means, operatively connected to said weighting means, for summing the weighted products produced by said weighting means;
switch means, operatively connected to said first and second summer means, for selecting a sum from either said first or second summer means in accordance with a type of noise and interference present in the transmitted signal; and
threshold means, operatively connected to said switch means, for determining a polarity of the selected sum from said switch means.

26. The digital Mode S Interrogation Signal Processor as claimed in claim 25, wherein eight samples of the transmitted signal produce one bit of data.

27. The Mode S Interrogation Signal Processor as claimed in claim 25, wherein said digital Hilbert transform means comprises:
Hilbert delay means, operatively connected to said splitter means, for delaying said quadrature signal and said in-phase signal by one clock cycle;
first subtractor means, operatively connected to said Hilbert delay means and said delay means, for subtracting a current quadrature signal from the delayed quadrature signal to produce the transformed quadrature signal; and
second subtractor means, operatively connected to said Hilbert delay means and said delay means, for subtracting a current in-phase signal from the delayed in-phase signal to produce the transformed in-phase signal.

28. The Mode S Interrogation Signal Processor as claimed in claim 25, wherein said Mode S signal detector means comprises:
comparator means, for comparing a voltage level of the transmitted signal with a threshold level to produce a pulse when said voltage level exceeds said threshold level; and
correlator means, operatively connected to said comparator means, for determining if said comparator means has produced two pulses and if said two pulses are separated by predetermined time gap;
said correlator means, producing a preamble detection signal when said two pulses are present and are separated by said predetermined time gap, thereby indicating that a Mode S signal is being received.

29. The Mode S Interrogation Signal Processor as claimed in claim 25, further comprising:
computer means, operatively connected to said threshold means, for receiving serially said data produced by said threshold means and for using said data to avoid collisions with other moving objects.

30. The Mode S Interrogation Signal Processor as claimed in claim 25, further comprising:
Mode C means for processing and identifying a Mode C signal.

31. The Mode S Interrogation Signal Processor as claimed in claim 25, further comprising:
Mode A means for processing and identifying a Mode A signal.

32. The Mode S Interrogation Signal Processor as claimed in claim 28, wherein said threshold level is programmable.

33. A digital Mode S uplink demodulator for demodulating a received Mode S signal, comprising:

phase splitting means, for splitting the received Mode S signal into an in-phase signal and a quadrature signal;

digital Hilbert transformation means, operatively connected to said phase splitting means, for performing a Hilbert transformation upon said in-phase signal and said quadrature signal to produce transformed signals;

delay means, operatively connected to said digital Hilbert transformation means, for delaying the transformed quadrature and in-phase signals by one clock cycle;

multiplying means, operatively connected to said delay means, for multiplying the delayed transformed quadrature signal with a current transformed quadrature signal and for multiplying the delayed transformed in-phase signal by a current transformed in-phase signal;

summer means, operatively connected to said multiplying means, for summing the products produced by said multiplying means; and threshold means, operatively connected to said summer means, for determining a polarity of the sum produced by said summer means.

34. The digital Mode S uplink demodulator as claimed in claim 33, wherein said threshold means produce data having a logic "1" when said polarity is positive and a logic "0" when said polarity is negative.

35. The digital Mode S uplink demodulator as claimed in claim 33, wherein said digital Hilbert transform means comprises:

Hilbert delay means, operatively connected to said splitter means, for delaying said quadrature signal and said in-phase signal by one clock cycle;

first subtractor means, operatively connected to said Hilbert delay means and said delay means, for subtracting a current quadrature signal from the delayed quadrature signal to produce the transformed quadrature signal; and second subtractor means, operatively connected to said Hilbert delay means and said delay means, for subtracting a current in-phase signal from the delayed in-phase signal to produce the transformed in-phase signal.

36. The digital Mode S uplink demodulator as claimed in claim 33, wherein said multiplying means comprises:

first multiplying means, operatively connected to said delay means, for multiplying the delayed transformed quadrature signal with a current transformed quadrature signal;

second multiplying means, operatively connected to said delay means, for multiplying the delayed transformed in-phase signal with a current in-phase signal; and weighting means, operatively connected to said summer means, said first multiplying means and said second multiplying means, for arithmatically weighing the products from said first and second multiplying means such that middle samples of the transmitted signal are given greater weight, thereby avoiding interference at either edge of a passband of said Mode S signal.

37. The digital Mode S uplink demodulator as claimed in claim 36, wherein eight samples of the transmitted signal produce one bit of data.

38. A digital Mode S uplink demodulator for demodulating a received Mode S signal, comprising:

phase splitting means, for splitting the received Mode S signal into an in-phase signal and a quadrature signal;

digital Hilbert transformation means, operatively connected to said phase splitting means, for performing a Hilbert transformation upon said in-phase signal and said quadrature signal to produce transformed signals;

delay means, operatively connected to said digital Hilbert transformation means, for delaying the transformed quadrature and in-phase signals by one clock cycle;

multiplying means, operatively connected to said delay means, for multiplying the delayed transformed quadrature signal with a current transformed quadrature signal and for multiplying the delayed transformed in-phase signal by a current transformed in-phase signal;

weighting means, operatively connected to said multiplying means, for arithmatically weighing the products from said multiplying means such that middle samples are given greater weight;

first summer means, operatively connected to said multiplying means, for summing the products produced by said multiplying means;

second summer means, operatively connected to said weighting means, for summing the weighted products produced by said multiplying means;

switch means, operatively connected to said first and second summer means, for selecting a sum from either said first or second summer means in accordance with a type of noise or interference present in the transmitted signal; and threshold means, operatively connected to said summer means, for determining a polarity of the sum produced by said summer means.

39. The digital Mode S uplink demodulator as claimed in claim 38, wherein said threshold means produce data having a logic "1" when said polarity is positive and a logic "0" when said polarity is negative.

40. The digital Mode S uplink demodulator as claimed in claim 38, wherein said digital Hilbert transform means comprises:

Hilbert delay means, operatively connected to said splitter means, for delaying said quadrature signal and said in-phase signal by one clock cycle;

first subtractor means, operatively connected to said Hilbert delay means and said delay means, for subtracting a current quadrature signal from the delayed quadrature signal to produce the transformed quadrature signal; and second subtractor means, operatively connected to said Hilbert delay means and said delay means, for subtracting a current in-phase signal from the delayed in-phase signal to produce the transformed in-phase signal.

41. A method for digitally receiving a Mode S signal comprising the steps of:

(a) detecting a preamble of a transmitted Mode S signal;

(b) generating a preamble detection signal when said step (a) detects the preamble;

(c) detecting a phase shift reversal in the transmitted Mode S signal when the preamble detection signal is present;

(d) generating a phase reversal signal when said step (c) detects the phase shift reversal;

(e) splitting the transmitted Mode S signal into a quadrature signal and an in-phase signal;

(f) performing a digital Hilbert transformation upon the quadrature and in-phase signals;

(g) delaying the transformed quadrature and in-phase signals for one clock cycle;

(h) multiplying the delayed transformed quadrature signal by a current transformed quadrature signal;

(i) multiplying the delayed transformed in-phase signal by a current transformed in-phase signal;

(j) summing the products of said steps (i) and (h);

(k) determining a polarity of the sum of said step (j);

(l) producing data having a logic "1" when said step (k) determines the polarity to be positive; and (m) producing data having a logic "0" when said step (k) determines the polarity to be negative.

42. The method as claimed in claim 41, wherein said step (a) comprises the steps of:

(n) comparing a voltage level of the transmitted Mode S signal with a threshold level;

(o) producing a pulse signal when said step (n) determines that the voltage level exceeds the threshold level;

(p) determining if said step (o) has produced two pulses which are separated by a predetermined time gap, thereby detecting a preamble of a Mode S signal when said step (o) has produced two pulses separated by the predetermined time gap.

43. The method as claimed in claim 42, wherein the threshold level is programmable.

44. The method as claimed in claim 41, wherein said step (f) comprises the steps of:

(n) delaying the quadrature signal and the in-phase signal by one clock cycle;

(o) subtracting a current quadrature signal from the delayed quadrature signal to produce the transformed quadrature signal; and (p) subtracting a current in-phase signal from the delayed in-phase signal to produce the transformed in-phase signal.

45. The method as claimed in claim 41, wherein the products of said steps (h) and (i) are arithmatically weighted prior to summing in said step (j) such that middle samples of the transmitted signal are given greater weight.

46. The method as claimed in claim 45, wherein eight samples of the transmitted data produce one bit of data.

47. The method as claimed in claim 41, further comprising the steps of:

(n) weighting arithmatically the products of steps (h) and (i);

(o) summing the weight products of said step (n); and (p) selecting either the sum of said step (j) or said step (o) according to a type of noise or interference present in the transmitted signal;

said step (k) determining a polarity of the selected sum of said step (p).

48. The method as claimed in claim 47, wherein said step (a) comprises the steps of:

(q) Comparing a voltage level of the transmitted Mode S signal with a reference threshold level;

(r) producing a pulse signal when said step (q) determines that the voltage level exceeds the threshold level;

(s) determining if said step (r) has produced two pulses which are separated by a predetermined time gap, thereby detecting a preamble of a Mode S signal when said step (r) has produced two pulses separated by the predetermined time gap.

49. The method as claimed in claim 48, wherein the threshold level is programmable.

50. The method as claimed in claim 47, wherein said step (f) comprises the steps of:

(q) delaying the quadrature signal and the in-phase signal by one clock cycle;

(r) subtracting a current quadrature signal from the current quadrature signal to produce the transformed quadrature signal; and (s) subtracting a current in-phase signal from the delayed in-phase signal to produce the transformed in-phase signal.

51. A method for receiving a Mode S signal comprising the steps of:

(a) determining if a Mode S signal is being received;

(b) digitally demodulating the received Mode S signal when said step (a) has determined that the received signal is Mode S;

said step (b) including, (c) splitting the transmitted Mode S signal into a quadrature signal and an in-phase signal;

(d) performing a digital Hilbert transformation upon the quadrature and in-phase signals;

(e) delaying the transformed quadrature and in-phase signals for one clock cycle;

(f) multiplying the delayed transformed quadrature signal by a current transformed quadrature signal;

(g) multiplying the delayed transformed in-phase signal by a current transformed in-phase signal;

(h) summing the products of said steps (f) and (g);

(i) determining a polarity of the sums of said step (h);

(j) producing data having a logic "1" when said step (i) determines the polarity to be positive; and (k) producing data having a logic "0" when said step (i) determines the polarity to be negative.

52. The method as claimed in claim 51, wherein said step (a) comprises the steps of:

(l) comparing a voltage level of the transmitted Mode S signal with a threshold level;

(m) producing a pulse signal when said step (l) determines that the voltage level exceeds the threshold level;

(n) determining if said step (m) has produced two pulses which are separated by a predetermined time gap, thereby detecting a preamble of a Mode S signal when said step (m) has produced two pulses separated by the predetermined time gap.

53. The method as claimed in claim 52, wherein the threshold level is programmable.

54. The method as claimed in claim 51, wherein said step (d) comprises the steps of:

(l) delaying the quadrature signal and the in-phase signal by one clock cycle;

(m) subtracting a current quadrature signal from the delayed quadrature signal to produce the transformed quadrature signal; and (n) subtracting a current in-phase signal from the delayed in-phase signal to produce the transformed in-phase signal.

55. The method as claimed in claim 51, wherein the products of said steps (f) and (g) are arithmatically weighted prior to summing in said step (h) such that middle samples of the transmitted signal are given greater weight.

56. The method as claimed in claim 55, wherein eight samples of the transmitted data produce one bit of data.

57. A method for receiving a Mode S signal comprising the steps of:
   (a) determining if a Mode S signal is being received;
   (b) digitally demodulating the received Mode S signal when said step (a) has determined that the received signal is Mode S;
   said step (b) including,
   (c) splitting the transmitted Mode S signal into a quadrature signal and an in-phase signal;
   (d) performing a digital Hilbert transformation upon the quadrature and in-phase signals;
   (e) delaying the transformed quadrature and in-phase signals for one clock cycle;
   (f) multiplying the delayed transformed quadrature signal by a current transformed quadrature signal;
   (g) multiplying the delayed transformed in-phase signal by a current transformed in-phase signal;
   (h) weighting arithmatically the products of said steps (f) and (g);
   (i) summing the products of said steps (f) and (g);
   (j) summing the weight products of said step (h);
   (k) selecting either the sum of said step (i) or the sum of said step (j) according to a type noise or interference present in the transmitted signal;
   (l) determining a polarity of the selected sum of said step (k);
   (m) producing data having a logic "1" when said step (l) determines the polarity to be positive; and
   (n) producing data having a logic "0" when said step (l) determines the polarity to be negative.

58. The method as claimed in claim 57, wherein said step (a) comprises the steps of:
   (o) comparing a voltage level of the transmitted Mode S signal with a threshold level;
   (p) producing a pulse signal when said step (o) determines that the voltage level exceeds the threshold level;
   (q) determining if said step (p) has produced two pulses which are separated by a predetermined time gap, thereby detecting a preamble of a Mode S signal when said step (p) has produced two pulses separated by the predetermined time gap.

59. The method as claimed in claim 58, wherein the threshold level is programmable.

60. The method as claimed in claim 57, wherein said step (d) comprises the steps of:
   (o) delaying the quadrature signal and the in-phase signal by one clock cycle;
   (p) subtracting a current quadrature signal from the delayed quadrature signal to produce the transformed quadrature signal; and
   (q) subtracting a current in-phase signal from the delayed in-phase signal to produce the transformed in-phase signal.

61. A method for digitally demodulating an uplink Mode S signal, comprising the steps of:
   (a) splitting the uplink Mode S signal into a quadrature signal and an in-phase signal;
   (b) performing a digital Hilbert transformation upon the quadrature and in-phase signals;
   (c) delaying the transformed quadrature and in-phase signals for one clock cycle;
   (d) multiplying the delayed transformed quadrature signal by a current transformed quadrature signal;
   (e) multiplying the delayed transformed in-phase signal by a current transformed in-phase signal;
   (f) summing the products of said steps (d) and (e);
   (g) determining a polarity of the sums of said step (f);
   (h) producing data having a logic "1" when said step (g) determines the polarity to be positive; and
   (i) producing data having a logic "0" when said step (g) determines the polarity to be negative.

62. The method as claimed in claim 61, wherein said step (b) comprises the steps of:
   (j) delaying the quadrature signal and the in-phase signal by one clock cycle;
   (k) subtracting a current quadrature signal from the delayed quadrature signal to produce the transformed quadrature signal; and
   (l) subtracting a current in-phase signal from the delayed in-phase signal to produce the transformed in-phase signal.

63. The method as claimed in claim 61, wherein the products of said steps (d) and (e) are arithmatically weighted prior to summing in said step (f) such that middle samples of the transmitted signal are given greater weight.

64. The method as claimed in claim 63, wherein eight samples of the transmitted data produce one bit of data.

65. A method for digitally demodulating an uplink Mode S signal, comprising the steps of:
   (a) splitting the uplink Mode S signal into a quadrature signal and an in-phase signal;
   (b) performing a digital Hilbert transformation upon the quadrature and in-phase signals;
   (c) delaying the transformed quadrature and in-phase signals for one clock cycle;
   (d) multiplying the delayed transformed quadrature signal by a current transformed quadrature signal;
   (e) multiplying the delayed transformed in-phase signal by a current transformed in-phase signal;
   (f) weighting arithmatically the products of (d) and (e);
   (g) summing the products of said steps (d) and (e);
   (h) summing the weighted products of said step (f);
   (i) selecting either the sum of said step (g) or the sum of said step (h) according to a type of noise or interference present in the transmitted signal;
   (j) determining a polarity of the selected said step (i);
   (k) producing data having a logic "1" when said step (j) determines the polarity to be positive; and
   (l) producing data having a logic "0" when said step (j) determines the polarity to be negative.

66. The method as claimed in claim 65, wherein said step (b) comprises the steps of:
   (m) delaying the quadrature signal and the in-phase signal by one clock cycle;
   (n) subtracting a current quadrature signal from the delayed quadrature signal to produce the transformed quadrature signal; and
   (o) subtracting a current in-phase signal from the delayed in-phase signal to produce the transformed in-phase signal.

* * * * *